Patented Feb. 5, 1924.

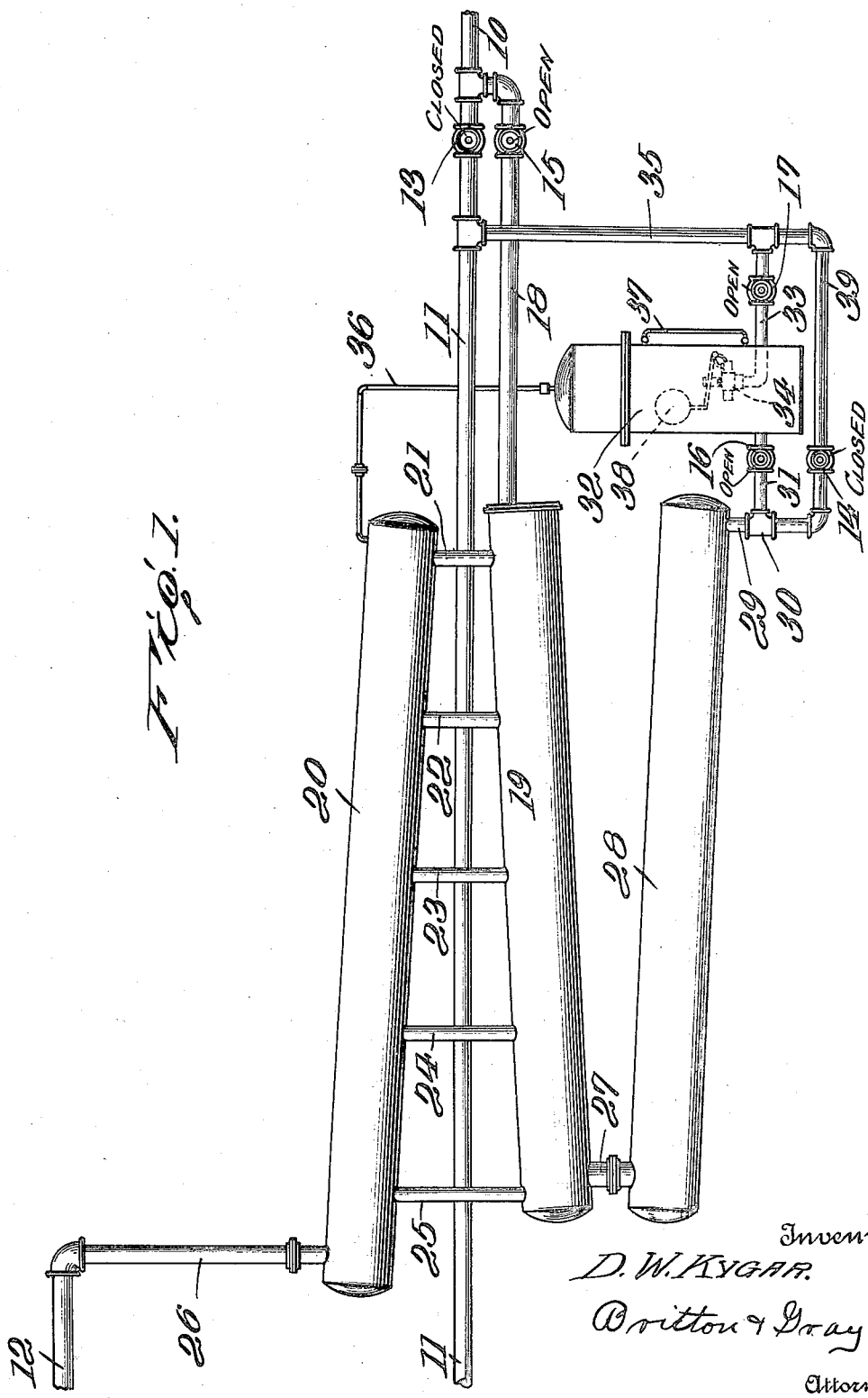

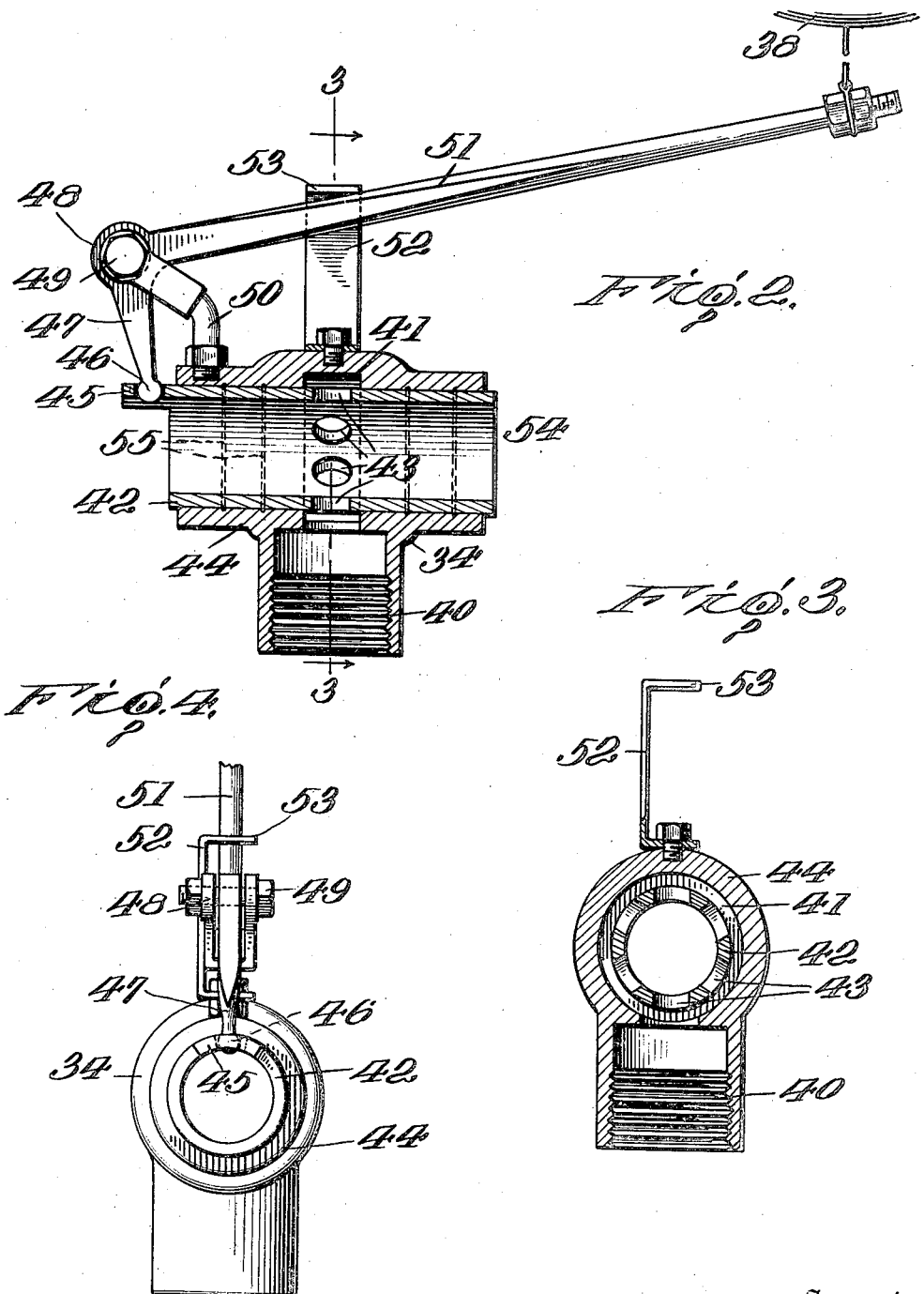

1,482,688

UNITED STATES PATENT OFFICE.

DANIEL W. KYGAR, OF PONCA CITY, OKLAHOMA, ASSIGNOR TO KAY COUNTY GAS COMPANY, OF PONCA CITY, OKLAHOMA.

GAS TRAP.

Application filed August 2, 1922. Serial No. 579,216.

*To all whom it may concern:*

Be it known that I, DANIEL W. KYGAR, citizen of the United States, residing at Ponca City, in the county of Kay and State of Oklahoma, have invented certain new and useful Improvements in Gas Traps, of which the following is a specification.

The invention relates to an apparatus for use at the mouth of a well for the purpose of separating the gas and oil flowing from the well. A further object of the invention is the provision of an apparatus of the character mentioned which will not permit gas to escape into the oil tank in the event that the well should flow gas only for a considerable length of time. A further object of the invention is the provision of a float valve which will render effective service with the type of apparatus provided by the invention.

An illustrative embodiment of the invention is shown in the accompanying drawings in which Fig. 1 is a diagrammatic elevation of the apparatus;

Fig. 2 is a central vertical section partly in elevation of a float valve;

Fig. 3 is an end elevation of the float valve;

Fig. 4 is a vertical transverse section on line 3—3 of Fig. 2.

The apparatus illustrated in Fig. 1 is adapted to be attached to the outlet of the well at 10. The pipe 11 is designed to be connected to a reservoir for reception of oil from the well and the pipe 12 to a storage tank for gas, or to a gas main. In the normal operation of the apparatus the valves 13 and 14 are kept closed and the valves 15—16 open, as indicated by legends upon the drawing. With the valves arranged as mentioned, oil from the well entering pipe 10 will pass through open valve 15, pipe 18 to cylinder 19, which cylinder is shown as being in open communication with cylinder 20 by means of a plurality of pipes, five being shown, numbered 21, 22, 23, 24 and 25. It will be understood that a greater or less number of connecting pipes may be provided.

The cylinder 19 is shown as inclined downwardly and the cylinder 20 as inclined upwardly. The mixture of oil and gas entering cylinder 19 will have its gas separated by gravity from the oil expedited by the expansion of the gas, which gas will pass upwardly through the communicating pipes into the cylinder 20 and from the cylinder 20 through a pipe 26 and pipe 12 to the main gas line at whatever pressure is required for its delivery to consumer or to storage tank. The separation apparatus being under the pressure of the well and a less pressure being present in the line conveying the gas to users, a storage tank for gas is not a requisite. The gas may be delivered by conduit 12 to either the user's supply line or to a storage tank.

The lower end of the cylinder 19 is shown as connected by means of a pipe 27 of comparatively large diameter with a cylinder 28 which is also downwardly inclined from its inlet 27 to its outlet to the pipe 29.

The oil and gas entering cylinder 19 under pressure will be so intimately mixed that not all of the gas will be able to separate from the oil in the cylinder 19 and may therefore separate in the cylinder 28 and pass upwardy in this cylinder to the pipe 27, past the down flowing oil therein and find exit through one of the commuicating pipes 24—25. The pipe 29 is shown as provided with a T 30, to one branch of which a pipe 31 is shown leading to a tank 32, the valve 16 being open in this pipe. The outlet for oil from the tank 32 through the pipe 33 is controlled by a float valve 34, the pipe 33 leading to a pipe 35, which in turn discharges into pipe 11, and thus to the storage tank for oil.

To equalize the pressures in the system the tank 32 is connected at its top by means of a pipe 36 with the cylinder 20. A gage glass 37 is provided upon the tank 32 so that the level of the oil therein may at all times be readily ascertained.

The float valve 34 is normally closed and is adapted to be opened by means of the float 38 when the oil reaches a predetermined level in the tank.

At any time valves 16—17 may be closed and valve 14 open, thus short-circuiting the tank 32 by providing a path for the oil through pipe 39 to pipe 35. Moreover by closing valve 15 and opening valve 13 the oil from the well may be led directly into pipe 11 and into the storage tank, thus short-circuiting the entire apparatus.

The provision of the tank 32 having its outlet controlled by a float valve will ensure periods of rest to the oil in the tank, allowing a quiet separation of the gas therefrom through the pipe 36, should there be gas remaining in the oil when it reaches the tank, and moreover in the event that the well should run pure gas for a period, the valve 34 being closed, no gas could gain access to the pipe 11. The oil will escape to pipe 11 above its level in tank 32 when the float valve is open, due to the fact that the tank to which pipe 11 leads is under atmospheric pressure while the apparatus, including tank 32, is under the pressure of the well.

The form of valve illustrated in Figs. 2, 3 and 4 has special value in connection with the apparatus here shown, in that a comparatively free flow of oil is provided thereby, and because of its simplicity it is not likely to get out of order, thereby necessitating the opening of the tank. As shown the valve 34 comprises a casing 44 in the form of a T adapted to be screwed upon the outlet pipe 33 by means of the screw threaded portion 40. The horizontal portion of the T is shown as provided with an annular recess 41 and an open ended cylinder 42 is slidable in the horizontal portion of the T. A plurality of holes 43 are provided in the cylinder 42 which allow the oil to escape from the interior of the cylinder through the channel 41 into the pipe 33. The cylinder 42 is provided with a projection 45 having a hole therein for reception of a ball 46 upon the end of one arm 47 of a bell crank lever 48 pivoted at 49 upon a bracket 50, the other arm 51 of the lever having secured thereto the float 38. When the level of the fluid in which the float is immersed falls the weight of the float 38 and the arm 51 will cause the cylinder 42 to be reciprocated, moving the holes 43 out of register with the channel 41. The movement of the arm 51 is adapted to be controlled within desired limits by a bracket 52 having an arm 53 projecting above the arm 51.

The valve 34 being immersed in oil will at all times be thoroughly lubricated, which lubrication is assisted by means of grooves 54—55 in the interior of the horizontal portion of the valve casing. The valve consisting of but two movable parts is very unlikely to get out of order and is therefore adapted to give continuous and efficient service in the location mentioned.

Minor changes may be made in the physical embodiment of the invention without departing from its spirit.

What I claim is:

1. A gas trap comprising, in combination, a downwardly inclined cylinder adapted to have its higher end connected to the outlet of a well, a second cylinder adjacent and diverging upwardly relative to said first named cylinder, a conduit connecting said cylinders at points adjacent the higher end of the first and the lower end of the second named thereof so arranged that the second cylinder may drain by gravity into the first named cylinder, means to connect the upper and lower cylinders respectively with gas and liquid receiving means.

2. A gas trap comprising, in combination, a downwardly inclined cylinder adapted to be placed in communication with the outlet of a well, an upwardly inclined cylinder adjacent thereto, with its lower end higher than and in communication with the higher end thereof whereby the latter cylinder may receive gas separating from fluid received from the well and may drain by gravity into the former cylinder, liquid sealed means to pass liquid from the lower end of the first named cylinder and means to connect the second named cylinder with gas receiving means.

3. A gas trap comprising, in combination, a downwardly inclined cylinder adapted to be placed in communication at its higher end with the outlet of a well, an upwardly inclined cylinder above said first named cylinder, a plurality of conduits connecting said cylinders for escape of gas into said upper cylinder and for drainage by gravity from said upper to said lower cylinder, a tank in communication with the lower end of said first named cylinder, means in said tank to permit discharge of fluid therefrom when said fluid reaches a predetermined level therein, communication between said tank and a storage reservoir, communication between said second named cylinder and a gas pipe.

4. A gas trap comprising, in combination, a downwardly inclined cylinder adapted to have its higher end connected to the outlet of a well, a second cylinder above and diverging upwardly from said first named cylinder, a plurality of conduits connecting said cylinders, a third cylinder below and downwardly diverging from said first named cylinder having its higher end in communication with the lower end of said first named cylinder, a closed tank in communication with the lower end of said last named cylinder, a float valve controlled conduit to convey oil from said tank to a storage reservoir.

5. A gas trap comprising, in combination, a downwardly inclined cylinder adapted to have its higher end connected to the outlet of a well, a second cylinder above and diverging upwardly from said first named cylinder, a plurality of conduits connecting said cylinder, a third cylinder below and downwardly diverging from said first named cylinder having its higher end in communication with the lower end of said first named cylinder, a closed tank in communication with the lower end of said last named cylinder, a float valve controlled conduit to convey oil from said tank to a storage reservoir, means connecting the top of said tank with said second named cylinder.

DANIEL W. KYGAR.